United States Patent [19]

Kucera

[11] Patent Number: 4,655,031
[45] Date of Patent: Apr. 7, 1987

[54] PHASING CIRCUIT FOR SERIALLY
[75] Inventor: Frank C. Kucera, Lyons, Ill.
[73] Assignee: J. I. Case Company, Racine, Wis.
[21] Appl. No.: 758,298
[22] Filed: Jul. 24, 1985
[51] Int. Cl.[4] .................... A01D 34/24; A01B 63/22
[52] U.S. Cl. .................................. 56/11.9; 91/171; 91/520
[58] Field of Search ............... 56/11.9, 10.9, DIG. 15, 56/10.2; 60/484, 546; 91/171, 520

[56] References Cited
U.S. PATENT DOCUMENTS

| | | | |
|---|---|---|---|
| 3,579,989 | 5/1971 | Stark et al. | 60/546 |
| 4,354,688 | 10/1982 | Swanson | 91/520 |
| 4,407,109 | 10/1983 | Swanson et al. | 56/11.9 |
| 4,567,727 | 2/1986 | Grams | 91/520 |

Primary Examiner—Gene Mancene
Assistant Examiner—David L. Tarnoff
Attorney, Agent, or Firm—Dressler, Goldsmith, Shore, Sutker & Milnamow, Ltd.

[57] ABSTRACT

In a combine header having a rotatable crop reel, a hydraulic cylinder is carried on each of the reel support arms for adjusting the fore and aft position of the reel. The cylinders are serially connected and comprise a phasing circuit wherein the cylinders have paired fluid inlets and flow-restricting orifices, and the piston is positionable between the inlet and orifice of a pair in either full-strode position. A check valve is operationally associated with each orifice to prevent loss of fluid acting on the piston when being moved from either full-stroke position.

2 Claims, 3 Drawing Figures

PHASING CIRCUIT FOR SERIALLY

TECHNICAL FIELD

This invention relates to crop harvesting equipment, such as combines, and more particularly to a means for phasing a plurality of serially connected hydraulic cylinders of the type employed for adjusting the fore and aft reel position of a combine header.

BACKGROUND OF THE INVENTION

Modern-day machinery has integrated all phases of the crop harvesting process. Though typically thought of as one unit, a combine actually comprises three sections: a header for gathering, cutting, and consolidating the crop material; a feeder for conveying the consolidated crop from the header to a thresher-separator; and a thresher-separator for removing and separating the crop from the plant material.

Within the header itself are typically four components: a longitudinal divider on each side of the header which partitions the crop to be cut during the current swath from that to be cut during future swaths, and biases said crop either toward or away from a cutter; a transverse reciprocating cutter which severs the plant at or near ground level; a transverse reel which feeds the standing crop into the cutter and the severed crop into a rearwardly located transverse trough; and a transverse auger which consolidates the crop at some point along its length and delivers the crop into the feeder.

During harvesting operations, a change in crop conditions may necessitate repositioning the reel relative to the cutter or dividers to prevent grain losses. However, as header widths have increased in response to demands for increased capacity machinery, reel mass has correspondingly increased whereby it no longer is feasible for operators to manually reposition the reel without the aid of a mechanically advantaged device. Simple devices enabling such adjustments are not new to the art as seen in U.S. Pat. Nos. 2,387,069, and 3,283,487. U.S. Pat. No. '069 teaches a mechanical means for vertical reel adjustment, and a screw means for fore and aft reel adjustment. U.S. Pat. No. '487 teaches similar adjustments using a hydraulic means, but does not describe hydraulic circuitry or address problems of equalization or phasing between the pair of cylinders mounted on oppposite sides of the reel. Experience has shown that such problems do arise, especially with serially connected hydraulic cylinders.

Leakage rates past piston seals of new double-acting hydraulic cylinders typically fall within a narrow range. However, as the piston seals wear differently with usage due to nonuniform cylinder wall finishes, dimensional inaccuracies, oil contamination, etc., their leakage rates will variously increase. If two cylinders having dissimilar leakage rates are serially connected, such as in the application under consideration, one cylinder will continually attempt to lead or lag the other, thereby creating an undesirable skew in the header reel. Furthermore, replacing any of the serially connected hydraulic cylinders, fittings or hoses will also affect the phasing. It therefore becomes desirable to have a convenient means to occasionally rephase the pistons.

One conventional phasing technique utilizes a combination of an orifice inlet and a main inlet located within each cylinder port, whereby only the orifice inlet is positioned to allow restricted flow between the two cylinder ports subsequent to the piston reaching either full extended or retracted stroke position. Such flow provides the volumetric means for phasing all downstream serially connected cylinders in a likewise full-stroke position. A disadvantage of this technique becomes apparent when the piston is initially stroked in a direction away from its fully stroked position. The initial movement of said piston is dependent upon a pressure differential across the orifice inlet, through which undesirably passes a portion of the fluid flow supplied for actuation of the piston. As fluid viscosity changes, especially with temperature changes, the flow required to achieve an adequate pressure differential across the orifice inlet to initiate piston movement increases. Similarly, as the piston load increases, so must the pressure differential across the orifice inlet, and therefore the fluid flow. The operator must therefore vary the fluid flow to correspond to conditions. If the operator has increased his flow to compensate for a lowered viscosity oil, the piston travel rate may be unacceptably great, especially with small bore cylinders typically used in such applications.

There thus exists a need for hydraulic circuitry which achieves phasing of a plurality of serially connected cylinders and which eliminates the dependency upon sufficient fluid flow to initiate piston travel opposite its fully-stroked position.

SUMMARY OF THE INVENTION

This invention provides an improved phasing device on serially connected hydraulic cylinders whereby the phasing orifices are combined in line with check valves, thereby allowing fluid flow only away from the cylinder. In a preferred embodiment, the combine header includes a longitudinal double-acting hydraulic cylinder transversely pinned on both outer ends thereof, whereby actuation of the cylinders repositions the reel to a desired fore or aft location. By the addition of check valves, fluid may restrictively pass through the cylinder in a first direction from one port to a second port after the piston has been fully stroked; fluid may not flow in the opposite direction when the piston is desirably initially stroked away from its full stroke position. Such a hydraulic configuration thereby enables phasing of all cylinders within a series circuit during each full-stroke position, and insures that all fluid flow in the reverse direction will apply toward activating the hydraulic pistons, even under low flow and high piston load conditions.

BRIEF DESCRIPTION OF THE INVENTION

Figure 1:
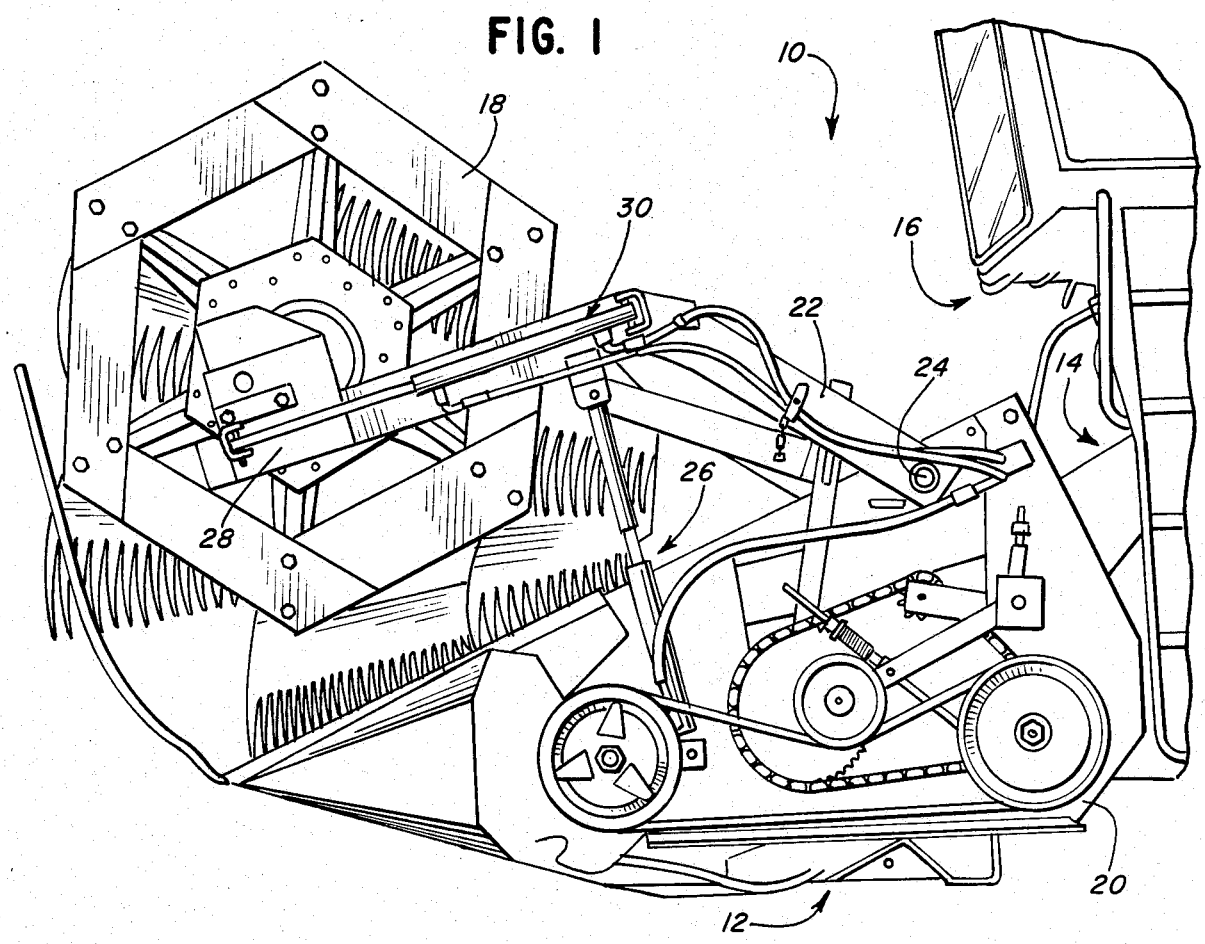
FIG. 1 is a fragmentary diagrammatic elevational view of a crop harvesting combine embodying the principles of the invention.

In FIG. 1, there is illustrated a typical combine 10 containing its three basic elements: a header 12, a feeder 14, and a thresher-separator 16. A rotatable reel 18 is transversely mounted from the lateral end plates 20 of the header 12 by means of a pair of reel support arms 22 pivotable as at 24. It will be understood that the opposite or right-hand side of the header, which is not shown, is a substantial mirror image of the illustrated left-hand side, and that the description herein applies equally to both sides.

A vertical or reel lift cylinder 26 is pivotally connected between the end plate 20 and support arm 22, whereby actuation of said reel lift cylinders imparts a vertical rotation of said reel support arms 28 to raise the reel 18.

A longitudinal or fore and aft cylinder 30 is connected between the support arm 22 and a slide plate 28 secured to the reel 18. Actuation of the longitudinal cylinders 30 imparts a fore and aft adjustment to the reel 18.

Figure 2:
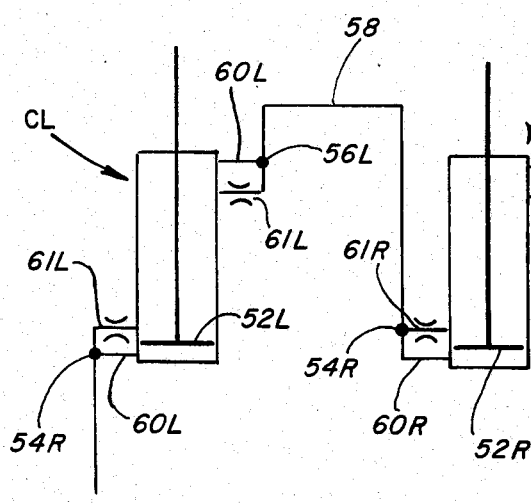
FIG. 2 is a schematic diagram of a prior art hydraulic cylinder phasing circuit.

In FIG. 2, there is illustrated prior art circuitry designed to achieve phasing between the equivalent left and right-hand longitudinal cylinders CL and CR. Each of said cylinders CL and CR comprises a piston 52 and first and second ports 54 and 56, shown diagrammatically in the drawing. The cylinders are serially connected so that second port 56L of cylinder CL communicates with first port 54R of cylinder CR through line 58, while the other pair of ports 54L and 56R return to the main hydraulic system and reservoir. Each of the ports 54 and 56 has formed therein a free-flowing main inlet 60 and a flow-restricting phasing orifice 61, and the cylinders are designed so that the piston 52, in the full-stroke position, either fully retracted as illustrated or fully extended, lies between the associated main inlet 60 and phasing orifice 61. While the paired arrangement of orifice 61 and inlet 60 above and below the full-stroked position served to achieve phasing of the connected cylinders, it gave rise to another hydraulics problem often encountered during operation.

It is well-known by those skilled in the art that an increase in fluid temperature causes a decrease in fluid viscosity. Typically, the specific fluid flow required to create the necessary pressure differential across the orifice 61 for moving the piston 52 from its full-stroked position is pre-set for relatively cold starting operation of the combine. As fluid temperature increases during operation, however, and the fluid viscosity decreases, the fluid flow is sometimes insufficient to create the required pressure differential, because more of the less viscous fluid enters the cylinder through the orifice. Although mechanical devices have been occasionally used to enable adjustment of the fluid flow to compensate for viscosity changes, the cylinders 30 employed with combines are typically small bore and control sensitive to increases in fluid flow.

Figure 3:
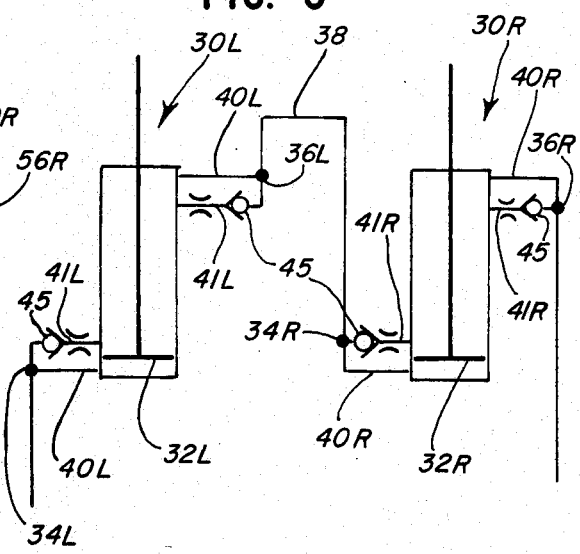
FIG. 3 is a similar diagram of the hydraulic circuit of the invention.

In FIG. 3, there is illustrated the novel circuitry of the invention which overcomes the described problem. Each of the cylinders 30L and 30R comprises a piston 32 and first and second ports 34 and 36. The cylinders are serially connected through line 38 so that the second port 36L of cylinder 30L communicates with first port 34R of cylinder 30R. Ports 34L and 36R connect to the main hydraulic system and reservoir. Each of the ports 34 and 36 has formed therein a free-flowing main inlet 40 and a flow-restricting phasing orifice 41, and the cylinders are designed so that the piston 32 in the full-stroke position, either fully retracted as shown or fully extended, lies between the associated main inlet 40 and phasing orifice 41. In each of the phasing orifices 41 there is operationally mounted a check valve 45, said check valves permitting restricted flow of fluid out of the cylinders 30L and 30R, but preventing flow of fluid therethrough into said cylinders. It will thus be appreciated that sufficient pressure differential across the orifices for moving the piston from the full stroke position is always assured, irrespective of changes in fluid viscosity. On the other hand, the permissive outward flow of fluid through the check valve 45 enables the desired phasing of the cylinders 30L and 30R to continue uninterruptedly.

It should be appreciated that the use of such orientation expressions as "left" and "right" has been made solely for purposes of ease of description, and that the principles of the invention are not to be limited in any way by the specific embodiment described. The invention is defined by the claims that follow.

What is claimed is:

1. A phasing circuit for a pair of serially connected hydraulic cylinders comprising:
   a port in each of said cylinders adjacent the top and bottom thereof;
   a fluid inlet and longitudinally spaced flow-restricting orifice in each of said ports;
   conduit means connecting the top port of one cylinder with the bottom port of the other cylinder;
   a piston in each of said cylinders positionable in either full-stroke position between the associated inlet and orifice; and
   a check valve operationally connected to each of said orifices permitting flow of fluid out of the cylinder but preventing flow therethrough into the cylinder,
   thereby preventing flow of fluid into the cylinder ahead of the piston and concomitant loss of fluid pressure acting on the piston when the piston is being moved from either full stroke position.

2. In a combine header including a transverse crop reel rotatably mounted on a pair of support arms and means for adjusting the fore and aft position of the reel, said means comprising:
   a hydraulic cylinder mounted on each of said support arms and operationally connected to said reel for moving said reel fore and aft;
   a port in each of said cylinders adjacent the top and bottom thereof;
   a fluid inlet and longitudinally spaced flow-restricting orifice in each of said ports;
   means in fluid comminication with each associated inlet-orifice pair;
   conduit means connecting the top inlet-orifice pair of one cylinder with the bottom inlet-orifice pair of the other cylinder;
   a piston in each cylinder positionable in either full-stroke position between the associated inlet and orifice; and
   a check valve operationally associated with each of said orifices permitting flow of fluid out of the cylinder but preventing flow therethrough into the cylinder,
   thereby preventing flow of fluid into the cylinder ahead of the piston and concomitant loss of fluid pressure acting on the piston when the piston is being moved from either full stroke position.

* * * * *